Oct. 4, 1938. D. W. MOLINS Re. 20,876
CIGARETTE MAKING MACHINE
Original Filed Nov. 19, 1932
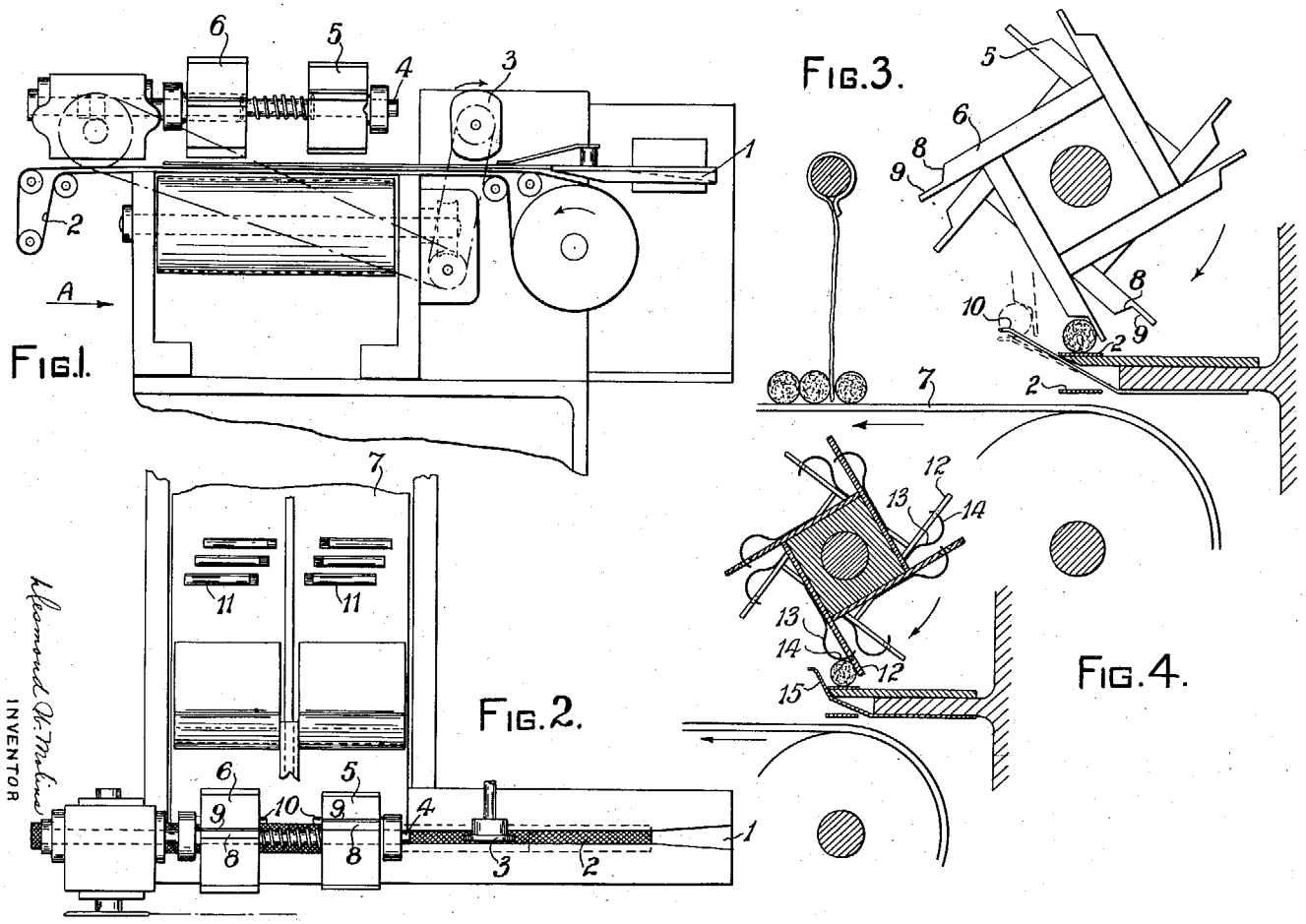
Desmond W. Molins
INVENTOR
By Watson, Coit, Morse & Grindle
Attorneys Reissued Oct. 4, 1938

Re. 20,876

UNITED STATES PATENT OFFICE 20,876

CIGARETTE MAKING MACHINE

Desmond Walter Molins, Bexley, England

Original No. 1,974,032, dated September 18, 1934, Serial No. 643,509, November 19, 1932. Application for reissue August 3, 1936, Serial No. 94,118. In Great Britain December 2, 1931

4 Claims. (Cl. 198—31)

This invention is for improvements in or relating to cigarette making machines of the continuous rod type, and has for one of its objects to provide means for collecting cigarettes from high speed cigarette machines in such a manner that they will not be damaged by the collecting apparatus.

A further object of the invention is to collect the cigarettes in such a manner that cigarettes of less or greater weight than normal may be readily distinguished from cigarettes of normal weight.

In cigarette machines of the continuous rod type, the rod is cut into separate cigarettes by a cutting apparatus, and the cigarettes are delivered endwise after which their endwise movement is checked and they are deflected laterally on to a conveyor belt.

Although many means have been devised for deflecting the cigarettes on to the conveyor belt, the cigarettes are always more or less damaged in the process, particularly in the case of high speed machines and the damage increases as the speed gets higher.

The present invention consists of a device for collecting cigarettes as they emerge from the cutting device of a continuous rod cigarette machine comprising means which automatically operate to grip each cigarette and arrest the axial flight of the same.

Further, the invention consists of a device as set forth in the preceding paragraph which operates to arrest each cigarette at a particular point in its axial path which depends on the density of filling of the said cigarette.

The invention will be more particularly described with reference to the accompanying drawing in which:—

Fig. 1 is an elevation of a portion of a cigarette making machine showing the invention applied thereto;

Fig. 2 is a plan of Fig. 1;

Fig. 3 is an end view, partly in section, taken in the direction of the arrow "A", Fig. 1; and Fig. 4 is a similar view to Fig. 3 of a modification.

Referring to the drawing, the cigarettes which are cut from the continuous rod pass from the cutting mechanism of the machine into the trough 1 in line with the rod, each cigarette pushing the preceding cigarette along the trough.

The cigarettes pass one at a time on to an endless tape 2 which is moving more rapidly than the cigarette rod so that each cigarette becomes separated a short distance from its successor.

In order to facilitate the separation, a rapidly rotating disc 3 which may be shaped as shown, is mounted above the tape and arranged to contact with each cigarette so that immediately the latter is lightly gripped between the tape and roller, its speed is increased and it separates from the following cigarette. This spacing apart of the cigarettes gives time to the rotary deflectors or vanes which are described later to operate and remove the cigarettes from the rod line.

The cigarettes are conveyed by the tape beneath the shaft 4 carrying two sets of deflectors or vanes 5 and 6 which are rotated in the direction shown in Fig. 4, the arrangement being such that a vane of each set contacts with an alternate cigarette and removes it from the tape on to the conveyor belt 7 which moves at right angles to the cigarette rod. Two rows of cigarettes are therefore formed on the belt as shown in Fig. 2, and the arrangement of the cigarettes in these rows will be referred to in more detail later.

The deflectors 5 and 6 which operate at a comparatively slow speed displace the cigarettes from their straight path, but during this movement the cigarettes are allowed to maintain the speed of the carrying tape 2, and their endwise motion is only arrested after each cigarette has left the tape. This is effected in the following manner:—

The face of each deflector is provided with a ledge 8 in such a manner that when the face 9 of the deflector contacts with the side of a travelling cigarette, the ledge 8 is located above and just clear of the cigarette.

A spring member 10 is provided which may be mounted below the travelling tape as shown in Fig. 3, and the end of which protrudes into the circular path described by the deflectors so that when a cigarette is removed from the tape by the deflector, it is caused to ride up the aforesaid spring and is thereby gripped between the spring, the face 9 of the deflector and the ledge 8 previously described.

It will thus be understood that the axial flight of the cigarette is arrested by gentle and resilient means, and further, that the tension of the spring may be so adjusted that soft loosely filled cigarettes will be arrested somewhat later than hard or firmly filled cigarettes.

When a cigarette has passed over the end of the spring it is carried away at right angles by the travelling band 7, and it will be understood that the loosely filled cigarettes will be out of alignment with the remainder. This is shown diagrammatically in Fig. 2 where 11 indicates the soft cigarettes. The extent by which the soft cigarettes are out of alignment may be varied by varying the angle or rise of the spring; or in other words, the time it takes for the spring to cause the cigarette to contact with the ledge on the deflector.

Referring to the modified form shown in Fig. 4 the vanes 12 are in this case provided with curve springs 13 which are shaped as shown to give a ledge 14 similar to the ledge 8 in the previous construction.

A fixed guide 15 is screwed to the frame of the machine and projects upwardly above the tape as shown. This guide is slotted to permit the passage of the vane 12, and the working of the apparatus is identical with that previously described.

Having thus described the invention, what is claimed as new and desired to be secured by Letters Patent is:

1. In apparatus for retarding the axial movement of cigarettes emerging from the cutting apparatus of a continuous rod machine, the combination with a member having a cigarette engaging surface extending generally in the direction of axial movement of the cigarettes and partaking of no substantial movement in such direction, of a member movable laterally of the direction of movement of the cigarettes through a path approaching the said surface of the first named member by less than the diameter of a cigarette, whereby the cigarettes are gripped between said members, and a conveyor for receiving and removing laterally the cigarettes thus gripped, one of said members being yieldable laterally of the cigarettes, said second named member being movable past said first named member to effect discharge of cigarettes laterally thereof to said conveyor.

2. In apparatus for retarding the axial movement of cigarettes emerging from the cutting apparatus of a continuous rod machine, the combination with an element rotating continuously about an axis extending generally in the direction of axial movement of the cigarettes, of a second element partaking of no substantial movement in the direction of axial movement of the cigarettes and provided with a cigarette engaging surface extending in the direction of axial movement of the cigarettes, one of said elements being yieldable laterally of the cigarettes, said elements being disposed in such close proximity as to grip the cigarettes passing therebetween and to displace the yieldable element.

3. In apparatus for retarding the axial movement of cigarettes emerging from the cutting apparatus of a continuous rod machine, the combination with a conveyor movable transversely of the direction of axial movement of the cigarettes, a continuously rotatable vane having an axis extending longitudinally of the direction of axial movement of the cigarettes for engaging and delivering cigarettes laterally on said conveyor, a fixed frame, a vane carried by said frame and having a cigarette engaging surface extending laterally of the direction of movement of the cigarettes, said rotatable vane being disposed in contiguous relation to said second vane and moving through a path removed from said second vane by a distance less than the diameter of a cigarette to grip the latter between said vanes, one of said vanes having a portion flexible laterally of the cigarettes to provide yielding gripping action.

4. In apparatus for arresting the axial movement of cigarettes emerging from the cutting apparatus of a continuous cigarette rod machine, the combination with a conveyor for feeding cigarettes in an axial direction, of a member having a reaction surface movable transversely to the axes of the cigarettes, but substantially immovable in the direction of the axes of the cigarettes, and means operative to move the cigarettes laterally from the conveyor and by the application of continued pressure to hold them with their sides against the reaction surface while the said reaction surface moves transversely to the axes of the cigarettes.

DESMOND WALTER MOLINS.